United States Patent [19]

Brucato et al.

[11] 4,311,552
[45] Jan. 19, 1982

[54] DEINKING OF NEWSPRINT

[75] Inventors: Albert Brucato; Richard J. Brooks, both of Seattle, Wash.

[73] Assignee: The Chemithon Corporation, Seattle, Wash.

[21] Appl. No.: 122,281

[22] Filed: Feb. 19, 1980

Related U.S. Application Data

[63] Continuation of Ser. No. 13,220, Feb. 21, 1979, abandoned.

[51] Int. Cl.³ .............................................. D21C 5/02
[52] U.S. Cl. ......................................... 162/5; 162/75
[58] Field of Search ....................... 162/4, 5, 8, 75, 76; 202/555

[56] References Cited

U.S. PATENT DOCUMENTS 2,061,620 11/1936 Downing et al. ............... 260/313 R
3,446,696 5/1969 Illingworth ............................. 162/5

FOREIGN PATENT DOCUMENTS 438403 11/1935 United Kingdom .................... 162/5

Primary Examiner—Peter F. Kratz
Attorney, Agent, or Firm—Merriam, Marshall & Bicknell

[57] ABSTRACT

Waste newsprint is defibered in an aqueous bath to which is added a deinking agent. The resulting slurry or pulp is rinsed, drained and formed into paper sheets. The deinking agent is a $C_{14}$ to $C_{20}$ alpha olefin sulfonate or a mixture of $C_{18}$ alpha olefin sulfonate and a nonionic detergent, depending upon the conditions of the deinking bath.

8 Claims, No Drawings

DEINKING OF NEWSPRINT

This is a continuation, of application Ser. No. 13,220, filed Feb. 21, 1973, now abandoned.

BACKGROUND OF THE INVENTION

The present invention relates generally to the deinking of waste cellulosic fibrous material impregnated with ink, such as waste newsprint, and more particularly to a deinking method using a detergent as the deinking agent.

In a typical deinking process, waste newsprint is introduced into an aqueous bath, which may or may not be alkaline, to which has been added, as a deinking agent, a surface active or detergent. The waste newsprint becomes defibered in the bath, and the ink is removed from the fibers by the detergent. The resulting slurry is composed of substantially deinked newsprint fibers, water, and the detergent and ink particles. The slurry is rinsed, liquid is drained from the slurry, and the resulting thickened pulp is recycled into sheets of paper by conventional processing procedures well known to those skilled in the paper making art.

The effectiveness of the deinking agent is determined by the brightness of the resulting paper sheets. Brightness is determined by a conventional test, and is expressed as a brightness number. The higher the number, the better the brightness.

SUMMARY OF THE INVENTION

In accordance with the present invention, it has been determined that improved brightness is obtained when there is used, as the deinking agent, a $C_{14}$ to $C_{20}$ alpha olefin sulfonate, especially a $C_{18}$ alpha olefin sulfonate. Further in accordance with the present invention, it has been determined that brightness is improved when the $C_{18}$ alpha olefin sulfonate is combined with a non-ionic detergent, such as a 9 mol alcohol ethoxylate, in the range 19:1 to 1:1, especially when the deinking procedure is conducted at a temperature substantially less than 40° C. (104° F.). At temperatures of 40° C. (104° F.) and above, the best results are obtained using the $C_{18}$ alpha olefin sulfonate alone.

Other features and advantages are inherent in the method and composition claimed and disclosed or will be apparent to those skilled in the art from the following detailed description.

DETAILED DESCRIPTION

In a preliminary evaluation, a variety of detergents were used as agents to deink samples of newsprint from the same batch. A conventional deinking procedure and brightness test were utilized. The results are indicated in Table I.

TABLE I

| | Brightness |
|---|---|
| Untreated newsprint pulp | 57 |
| Pulp processed with no detergent (plain water wash and rinse) | 62.2 |
| G.A.F. Igepal CO-630 | 66.7 |
| $C_{14,16}$ alpha olefin sulfonate (sodium salt) | 66.9 |
| Sodium lauryl sulfate | 66.3 |
| Sodium alkyl benzene sulfonate | 63.8 |
| Alkyl benzene sulfonate, isopropyl amine salt | 63.7 |

The results reflected by Table I show that alpha olefin sulfonate was the best of the various deinking agents evaluated. The olefin was a mixture of $C_{14}$ and $C_{16}$ in 1:1 ratio.

G.A.F. CO-630 is a conventional, non-ionic, commercial deinking agent constituting Nonyl phenoxy poly (ethyleneoxy) ethanol-9 mole.

In the examples described below, the following procedures were used. Old newspaper was defibered in water with the resulting pulp containing 5% by weight of the defibered newspaper. 200 grams of this pulp (10 grams of fiber) was used for each test. In some tests the pH of the pulp or slurry was adjusted, and this was done by adding sodium hydroxide to produce a pH of 9.5. The pulp was brought to and maintained at the desired temperature between 25° C. (77° F.) and 50° C. (132° F.) by placing the container for the pulp (a 400 ml. beaker) in a larger container which was a water bath of the desired temperature.

The deinking agent was then added to the pulp. The amount of deinking agent (D.A.) is expressed, in the following tables, as a percent of the dry weight of the fiber. After the deinking agent was added, the pulp was stirred vigorously for 5 minutes, as the wash treatment. The stirring was performed with a powered stirring device having a 1¾" propeller rotating at 2200 RPM.

Only a single wash cycle was used. The pulp was then transferred to 6 liters of water at the desired temperature, stirred for 30 seconds to disperse the pulp and then poured in a stream so as to drop 3 feet onto a horizontal 60 mesh stainless steel screen filter, as the rinse treatment.

The rinsing step was conducted over a 20 second (±5 seconds) period, and only one rinse cycle was used. The rinsed fiber was collected from the screen in a 400 ml. beaker without squeezing out entrained water, and the volume of the sample was adjusted to 200 mls. by adding water. Where the pH had previously been adjusted, it was readjusted to a pH of about 6 with sulfuric acid, otherwise it was left as it was. Although the procedures used in all the examples employed only a single wash and rinse cycle, this was for laboratory comparative purposes, and the deinking process need not be so limited.

From this washed and rinsed pulp, two hand sheets were made each weighing about 3 grams and measuring about 7¾"×7¾". A Williams 8"×8" Standard Sheet Mold was used. The mold was filled to a 2 liter mark, using water at ambient temperature. The Williams Standard Sheet Mold is a conventional device familiar to those skilled in the paper-making art.

The resulting hand sheets were tested for brightness on 5 spots on each side, using a conventional brightness test, and the readings were averaged. The brightness was taken with a Photovolt Reflection Meter, Model No. 670, a conventional instrument familiar to those skilled in the art of deinking newsprint.

The following Table II reflects the results obtained when comparing alpha olefin sulfonates (AOS) of different molecular weights, a conventional non-ionic commercial deinking agent (G.A.F. Igepal CO-630) and ethoxylated ammonium lauryl sulfate (60% active ingredient) (ELS-60), all of these being detergents or surface active agents. The AOS-$C_{10}$, $C_{18}$ and $C_{20}$ were made from olefins which were essentially a straight $C_{10}$, a straight $C_{18}$ and a straight $C_{20}$ respectively. The AOS described in the following tables is always the sodium salt.

TABLE II

| Deinking Agent | D.A. as Wt. % of Fiber | Wash pH | Temperature °C. Wash | Temperature °C. Rinse | Brightness |
|---|---|---|---|---|---|
| AOS—$C_{10}$ | 0.1 | As is | 25 | 40 | 54.8 |
| AOS—$C_{14,16}$ | " | " | " | " | 56.0 |
| AOS—$C_{18}$ | " | " | " | " | 58.3 |
| AOS—$C_{20}$ | " | " | " | " | 57.3 |
| ELS-60 | " | " | " | " | 56.9 |
| GAF—CO—630 | " | " | " | " | 55.2 |

Table II indicates that the deinking performance of an AOS is influenced by the molecular weight or number of carbon atoms in the alpha olefin from which it was made and that the AOS-$C_{18}$ is the most effective. The AOS $C_{18}$ is also more effective than the non-ionic detergent (CO-630) and the ethoxylated lauryl sulfate detergent (ELS-60).

The results reflected in Table II are confirmed by the results reflected in Table III, where, in addition to the deinking agents of Table II, results are also given for sodium lauryl sulfate (SLS) and linear alkyl benzene sulfonate, isopropyl amine salt (IPA-LAS).

TABLE III

| Deinking Agent | D.A. as Wt. % of Fiber | Wash pH | Temperature °C. Wash | Temperature °C. Rinse | Brightness |
|---|---|---|---|---|---|
| AOS—$C_{10}$ | 0.2 | As is | 25 | 45 | 52.0 |
| AOS—$C_{14,16}$ | " | " | " | " | 56.1 |
| AOS—$C_{18}$ | " | " | " | " | 58.1 |
| AOS—$C_{20}$ | " | " | " | " | 57.2 |
| GAF—CO—630 | " | " | " | " | 55.7 |
| ELS-60 | " | " | " | " | 55.4 |
| SLS | " | " | " | " | 54.0 |
| IPA-LAS | " | " | " | " | 55.3 |

Table IV reflects the results obtained when comparing AOS-$C_{18}$ with other detergents and with common additives to detergent formulations, such as sodium tripolyphosphate (STPP) and sodium carboxy methyl cellulose (CMC). Neodol 25-9 is a 9 mol alcohol ethoxylate non-ionic detergent. It is made from an alcohol mixture that has a molecular weight range of 12 to 15 carbon atoms, with an average of 13 carbon atoms. LAS is linear alkyl benzene sulfonate. AOS-$C_{15-18}$ is made from a mixture of olefins $C_{15}$ through $C_{18}$.

TABLE IV

| Deinking Agent | D.A. as Wt. % of Fiber | Wash pH | Temperature °C. Wash | Temperature °C. Rinse | Brightness |
|---|---|---|---|---|---|
| Neodol 25-9 | 0.2 | As is | 25 | 45 | 56.9 |
| CMC | " | " | " | " | 54.4 |
| STPP | " | " | " | " | 54.4 |
| LAS | " | " | " | " | 55.6 |
| AOS—C | | | | | |
| AOS—$C_{15-18}$ | " | " | " | " | 57.1 |
| AOS—$C_{18}$ | " | " | " | " | 58.3 |

Table V compares the combination of AOS-$C_{18}$ plus Neodol 25-9 (Neo), in a 1:1 ratio, with the same amount of each component alone, and Table V indicates that there is synergism in the combination at the temperatures indicated.

TABLE V

| Deinking Agent | D.A. as Wt. % of Fiber | Wash pH | Temperature °C. Wash | Temperature °C. Rinse | Brightness |
|---|---|---|---|---|---|
| Neo | 0.2 | As is | 25 | 45 | 56.9 |
| Neo + AOS—$C_{18}$ | " | " | " | " | 58.9 |
| AOS—$C_{18}$ | " | " | " | " | 58.3 |

In Table VI, the additives STPP and CMC were combined with the detergents (AOS-$C_{18}$ and Neodol 25-9) as shown. The additives were additions to the detergents rather than replacements thereof, so that, in those instances where additives were used, the total weight with additives was actually greater than that indicated as the weight of the deinking agent (0.2 wt.%).

TABLE VI

| Deinking Agent | D.A. as Wt. % of Fiber* | Wash pH | Temperature °C. Wash | Temperature °C. Rinse | Brightness |
|---|---|---|---|---|---|
| Neo | 0.2 | As is | 25 | 45 | 56.9 |
| Neo + CMC + AOS—$C_{18}$ | " | " | " | " | 58.4 |
| STPP + CMC + AOS—$C_{18}$ | " | " | " | " | 58.9 |
| AOS—$C_{18}$ | " | " | " | " | 58.3 |

*Neo and/or AOS—$C_{18}$ only.

Table VII reflects the results obtained when comparing combinations of AOS-$C_{18}$ and Neodol 25-9 in various ratios. This table shows, that, under the conditions indicated, the combination is better than an equal weight of each component alone.

TABLE VII

| Deinking Agent | D.A. as Wt. % of Fiber | Wash pH | Temperature °C. Wash | Temperature °C. Rinse | Brightness |
|---|---|---|---|---|---|
| AOS—$C_{18}$ | 0.2 | As is | 25 | 45 | 55.8 |
| AOS—$C_{18}$ + Neo used at ratio of: 19:1 | " | " | " | " | 57.5 |
| 9:1 | " | " | " | " | 56.2 |
| 3:1 | " | " | " | " | 57.0 |
| 1:1 | " | " | " | " | 58.1 |
| 1:3 | " | " | " | " | 56.6 |
| Neodol 25-9 | " | " | " | " | 53.2 |

Table VIII reflects a comparison similar to that of Table VII but with the wash temperature increased from 25° C. (77° F.) (Table VII) to 36° C. (97° F.) (Table VIII) and the pH adjusted to 9.5 in the examples of Table VIII. A combination of AOS-$C_{18}$ and Neodol 25-9 in the ratio 3:1 to 19:1 gave the best results.

TABLE VIII

| Deinking Agent | D.A. as Wt. % of Fiber | Wash pH | Temperature °C. Wash | Temperature °C. Rinse | Brightness |
|---|---|---|---|---|---|
| AOS—$C_{18}$ | 0.2 | 9.5 | 36 | 45 | 57.2 |
| AOS—$C_{18}$ + Neo used at ratio of: 19:1 | " | " | " | " | 59.8 |
| 9:1 | " | " | " | " | 59.6 |
| 3:1 | " | " | " | " | 59.6 |
| 2:1 | " | " | " | " | 58.4 |
| 1:1 | " | " | " | " | 58.4 |
| 1:2 | " | " | " | " | 57.4 |
| 1:3 | " | " | " | " | 58.5 |

TABLE VIII-continued

| Deinking Agent | D.A. as Wt. % of Fiber | Wash pH | Temperature °C. Wash | Temperature °C. Rinse | Brightness |
|---|---|---|---|---|---|
| Neodol 25-9 | " | " | " | " | 57.2 |

In the examples reflected by Table IX, the wash and rinse temperatures were the same. Deinking runs were made at the different temperature levels indicated. The wash pH was adjusted to 9.5, and the pH of the pulp was readjusted to 6 after the rinsing step. The total deinking agent used, in all instances, was 0.2 wt.% of the dry fiber weight of the waste newsprint subjected to deinking.

Table IX shows that, as the temperature increases, AOS-$C_{18}$ alone is superior to either Neodol 25-9 or the combination of AOS-$C_{18}$ and Neodol 25.9.

TABLE IX

| Deinking Agent | Brightness at indicated Temperature °C. for both Wash and Rinse | | | |
|---|---|---|---|---|
| | 20 | 30 | 40 | 50 |
| AOS—$C_{18}$ | 54.4 | 58.6 | 59.9 | 59.6 |
| $C_{18}$ + Neo 19:1 | 57.3 | 58.6 | 59.0 | 59.2 |
| $C_{18}$ + Neo 9:1 | 57.1 | 57.6 | 59.4 | 58.2 |
| Neodol 25-9 | 56.5 | 57.6 | 58.7 | 56.6 |

The processing conditions may vary somewhat from those used in the deinking examples reflected by the foregoing tables. For example, the pulp may contain 4% to 10% by weight of old newspaper, preferably 4% to 6% with 5 to 5.5% being optimum. The pH of the wash liquid may be adjusted to anywhere within the range 7.0 to 11.5 or higher, and preferably at least 7.1 (i.e. alkaline). The deinking agent may constitute 0.05% to 0.3% or more of the dry weight of the fiber. An increased concentration of deinking agent gives improved results, but at increased expense. 0.5% is probably a practical maximum in many instances. After the rinsing step and after adjusting the volume of the sample by adding water up to 200 ml., there may have been some solids loss so that the solids content of the sample is less than 5.0 wt.%. When the pH is readjusted after rinsing, the readjusted pH is in the range 4 to 6.5 (i.e. acid).

All of the alpha olefin sulfonates listed in the tables were sodium salts, but potassium or ammonium salts could also be used, for example. The ethoxylated alcohol non-ionic detergent could be made with 9–12 mols of ethylene oxide.

In the foregoing data reflecting the combination of the AOS-$C_{18}$ and the Neodol 25-9, the results obtained with the Neodol 25-9 are representative of results which would be obtained by combining other non-ionic surface active agents with the AOS-$C_{18}$. Examples of such other non-ionic surface active agents include:
Alkanol amides
Alkylaryl ethers
Ethoxylated alcohols
Ethoxylated alkyl phenols
Ethoxylated alkyl phenyl ethers
Ethoxylated fatty acids
Ethoxylated esters
Ethoxylated Sorbitan derivatives
Ethoxylated polypropyleneoxy glycol copol copolymers
Silicone derivatives
Sodium carboxymethyl cellulose Other examples of non-ionic surface active agents are described in McCutcheon's Detergents & Emulsifiera, International Edition, 1978 Annual, McCutcheon Division, MC Publishing Co., Glen Rock, N.J.

The foregoing detailed description has been given for clearness of understanding only, and no unnecessary limitations should be understood therefrom, as modifications will be obvious to those skilled in the art.

What is claimed is:

1. In a method for deinking cellulosic fibrous material impregnated with ink wherein a mixture of said material and water is stirred in the presence of a deinking agent, an improvement for increasing the brightness of the deinked material, said improvement comprising:
   using as the deinking agent a deinking agent consisting essentially of a $C_{15}$ to $C_{20}$ alpha olefin sulfonate; said mixture being at a temperature not substantially less than about 25° C. (77° F.).

2. In a method as recited in claim 1 wherein: said deinking agent is a $C_{18}$ alpha olefin sulfonate.

3. In a method as recited in claim 2 wherein: said mixture is at a temperature no less than 40° C. (104° F.).

4. In a method as recited in claim 3 wherein said stirring step is followed by the step of:
   rinsing said mixture with water at a temperature no less than 40° C. (104° F.).

5. In a method for deinking cellulosic fibrous material impregnated with ink wherein a mixture of said material and water is stirred in the presence of a deinking agent, an improvement for increasing the brightness of the deinked material said improvement comprising:
   using as the deinking agent a deinking agent consisting essentially of a $C_{18}$ alpha olefin sulfonate with a non-ionic surface active agent;
   the ratio of (1) $C_{18}$ alpha olefin sulfonate to (2) said non-ionic surface active agent is in the range 19:1 to 1:1 said mixture being at a temperature substantially less than 40° C. (104° F.).

6. In a method as recited in claim 5 wherein said stirring step is followed by the step of:
   rinsing said mixture with water at a temperature no less than 40° C. (104° F.).

7. In a method as recited in claim 5 wherein: said non-ionic surface active agent is a 9 mol alcohol ethoxylate.

8. In a method for deinking cellulosic fibrous material impregnated with ink wherein a mixture of said material and water is stirred in the presence of a deinking agent, an improvement for increasing the brightness of the deinked material, said improvement comprising:
   using as the deinking agent a deinking agent consisting essentially of a $C_{18}$ alpha olefin sulfonate with a non-ionic surface active agent;
   said non-ionic surface active agent being a 9 mol alcohol ethoxylate;
   the ratio of (1) $C_{18}$ alpha olefin sulfonate to (2) said non-ionic surface active agent being in the range 19:1 to 1:1;
   said mixture being at a temperature substantially less than 40° C. (104° F.).

* * * * *